Aug. 30, 1932.  W. H. NOELTING  1,875,112
SELF LUBRICATED CASTER SOCKET AND STEM
Filed Dec. 16, 1929
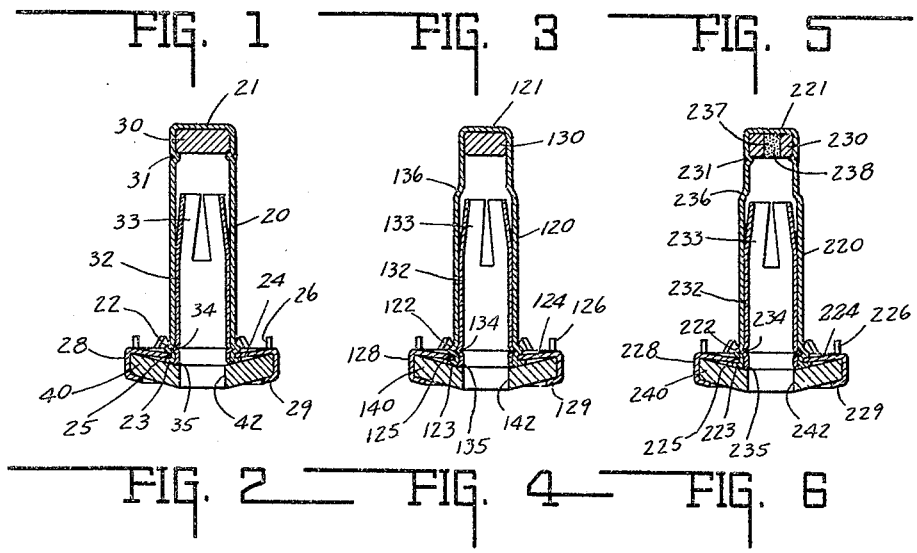
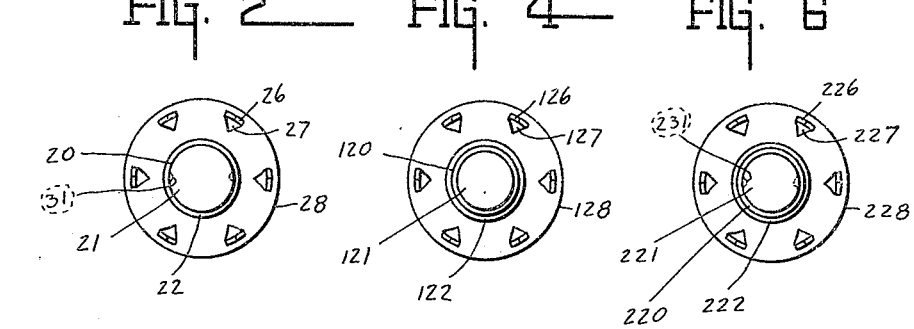
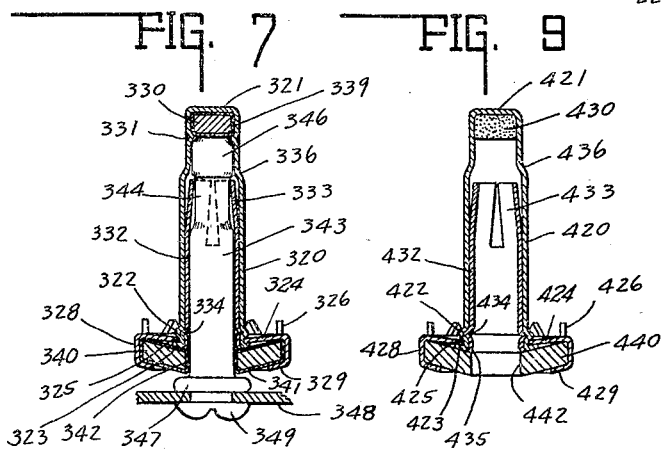
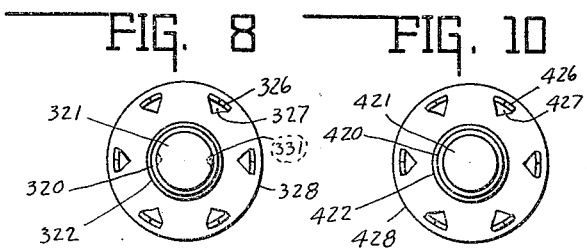
INVENTOR.
WILLIAM H. NOELTING.
BY Lockwood, Lockwood,
Goldsmith & Galt
ATTORNEYS.

Patented Aug. 30, 1932

1,875,112

UNITED STATES PATENT OFFICE

WILLIAM H. NOELTING, OF EVANSVILLE, INDIANA, ASSIGNOR TO FAULTLESS CASTER COMPANY, OF EVANSVILLE, INDIANA, A CORPORATION

SELF-LUBRICATED CASTER SOCKET AND STEM

Application filed December 16, 1929. Serial No. 414,297.

This invention relates to a self-lubricating caster socket and stem construction.

The chief object of this invention is to provide a caster with a socket that will readily swivel the same and will silently support said caster and such silence is obtainable by an anti-squeaking construction providing a top bearing and an anti-squeaking lateral thrust bearing.

Another object of the invention is to provide such a socket with a positive anchorage of a simple type which is adapted to anchor the socket to a furniture leg and which is also adapted to retain the anti-squeaking thrust bearing.

As an incidental feature, a socket of the aforesaid character is provided with positive means for detachably retaining a caster stem therein.

Another feature of the invention consists in the particular types of self lubricating bearing constructions employed.

The full nature of the invention will be more fully understood from the accompanying drawing and the following description and claims:

In the drawing Fig. 1 is a central sectional view of a caster socket embodying the invention.

Fig. 2 is a top plan view thereof.

Fig. 3 is a central sectional view through a modified form of socket.

Fig. 4 is a top plan view thereof.

Fig. 5 is a central sectional view through a further modified form of socket.

Fig. 6 is a top plan view thereof.

Fig. 7 is a central sectional view through a modified form of socket with a caster stem associated therewith.

Fig. 8 is a top plan view of the socket thereof.

Fig. 9 is a central sectional view of still a further modified form of socket.

Fig. 10 is a top plan view thereof.

In the drawing 20 indicates a tubular socket having a closed upper end 21 and an open mouth at its lower end, defined by a pair of spaced outwardly directed flanges 22 and 23 forming a groove to receive a plate 24 having the central aperture 25 therein.

The track plate in spaced relation to the aperture has a peripheral series of upstanding barbs 26 formed by striking the same from the plate as at 27 and said barbs are positioned adjacent the periphery of the plate. The plate includes a depending skirt 28 and extending inwardly therefrom is an annular retaining flange 29. The plate shown in Fig. 1 is dished toward the aperture therein.

Mounted beneath the plate and retained in the groove formed by the shirt and the inwardly directed flange, is a washer 40, which is of anti-friction and lubricant type and provided with an opening 42 therein, said opening registering with the tube opening. The washer 40 constitutes a lateral thrust bearing and is shown dished.

Mounted in the top of the tube and forming a top bearing is a top bearing member 30, which may be a composition of rubber and graphite as shown in Fig. 1 or may be otherwise formed as hereinafter setforth and otherwise illustrated. The top bearing disk 30 is herein shown retained within the tube and in position by a plurality of indentations 31.

A stem retaining sleeve construction of relatively thin spring metal is indicated at 32 and includes the stem gripping upper end 33 in the form of fingers and its lower end is anchored to the tube by the outwardly directed lateral enlargement 34 that nests in the similar portion 22 of the socket. If desired the sleeve may be extended as at 35 and laterally enlarged at the end thereof to form a groove between the portions 34 and 35 to clampingly embrace the similarly formed portion at the bottom end of the tube.

A caster stem of the character illustrated in Fig. 7 may be readily mounted in or detached from the socket.

In Figs. 3 and 4 a modified form of the invention is illustrated and in this form similar parts bear similar numerals of the 100 series. This form of the invention differs from that shown in Figs. 1 and 2 in that, first, the top bearing member is mounted in the top of the tube by press-fitting or the like, secondly, the tube adjacent the upper end of the sleeve 132 is reduced as at 136 to an extent such that the reduced continuation of the tube is in substantial circumferential alignment with the top portion 132 of the sleeve construction.

In Figs. 5 and 6 a modified form of the invention is illustrated wherein like parts are provided with numerals of the 200-series and in this form of the invention the socket tube is reduced at its upper end as at 236 and the top bearing 230 is retained therein as by the indentations 231. The top bearing 230 is herein illustrated as centrally apertured which in the present form is shown extending completely through the same as at 237 and the same is adapted to receive lubricant 238 which may be of paraffine-graphite composition.

In Figs. 7 and 8 a modified form of the invention is illustrated in which like parts are indicated by numerals of the 300-series. In this form the socket is reduced as at 336 and is indented as at 331 to retain the top bearing adjacent the closed top 321. The lubricant type member includes a top portion 330 coated with a composition 339 including paraffin and graphite as the chief and possibly the sole constituents. The annular thrust bearing member 340 is provided with a similar coating 341 which extends entirely around the same and within the aperture 342 thereof. The caster stem shown in this figure is indicated by the numeral 343 and includes a reduced portion 344 adjacent its upper end and herein the upper end is shown substantially flat as at 345 which is substantially transverse to the head portion 346 which in turn is in cylindrical alignment with the main body portion of the stem. The stem is enlarged as at 347 to retain a horn plate 348 of the caster wheel construction and the stem is further enlarged as at 349 for clampingly connecting the plate and stem together.

As shown in all of the forms of the invention, the track plate is dished toward the aperture and the lateral thrust bearing is also dished. In the event the top bearing should wear sufficiently to permit the enlargement 347 of the caster stem to gradually approach the track plate, where normally clearance is provided therebetween, the contact is silenced and is relative anti-friction by reason of the anti-friction lubricant type washer 340 employed and by reason of the downwardly projecting formation of such washer and track plate.

In Figs. 9 and 10 of the drawing a modified form of the invention is illustrated and like parts are indicated by numerals of the 400-series. In this form of the invention the top bearing 430 is press-fitted into the top of the tube and is shown as of a composition such as rubber with graphite included or an equivalent anti-friction lubricant type top bearing.

The invention claimed is:

1. A caster socket comprising a track plate with a central aperture therein, a peripheral series of upstanding barbs in spaced relation to the aperture, a socket tube clampingly connected at its lower end to the plate in the central aperture thereof, a peripheral skirt depending from the track plate, an annular thrust bearing beneath the tube and plate connection and having a central opening registering with the tube mouth, and means integral with the skirt and extending inwardly therefrom for engaging the thrust member for securing the same to the plate, said track plate being dished downwardly toward the aperture and said thrust member conforming thereto, whereby the central portion of said thrust member is exposed below the plane of the thrust member retaining member.

2. A caster socket comprising a track plate with a central aperture therein, a peripheral series of upstanding barbs in spaced relation to the aperture, a socket tube clampingly connected at its lower end to the plate in the central aperture thereof, means integral with the track plate and depending therefrom at the periphery, an annular thrust bearing beneath the tube and plate connection and having a central opening registering with the tube mouth, and means integral with the depending means and projecting inwardly therefrom for engaging the thrust member for securing the same to the plate, said track plate being dished downwardly toward the aperture and said thrust member conforming thereto, whereby the central portion of said thrust member is exposed below the plane of the thrust member retaining means.

3. A caster socket comprising a plate with a central aperture therein, a peripheral series of upstanding barbs in spaced relation to the aperture, a socket tube clampingly connected at its lower end to the plate in the central aperture thereof, a peripheral skirt depending from the plate, an annular thrust bearing beneath the tube and plate connection and having a central opening registering with the tube mouth, and means integral with the skirt and extending inwardly therefrom for engaging the thrust member for securing the same to the plate, said plate being dished downwardly toward the aperture and said thrust member conforming thereto, whereby the central portion of said thrust member is exposed below the plane of the thrust member retaining member, said inwardly directed means constituting an inwardly directed flange underlying the outer periphery of the annular thrust member and terminating above the lowest plane of the thrust member.

In witness whereof, I have hereunto affixed my signature.

WILLIAM H. NOELTING.